(12) United States Patent
Nakano et al.

(10) Patent No.: US 11,966,990 B2
(45) Date of Patent: Apr. 23, 2024

(54) CONSTRUCTION MANAGEMENT SYSTEM

(71) Applicant: Komatsu Ltd., Tokyo (JP)

(72) Inventors: Ichiro Nakano, Tokyo (JP); Toyohisa Matsuda, Tokyo (JP)

(73) Assignee: Komatsu Ltd., Tokyo (JP)

( * ) Notice: Subject to any disclaimer, the term of this patent is extended or adjusted under 35 U.S.C. 154(b) by 571 days.

(21) Appl. No.: 16/090,326

(22) PCT Filed: Aug. 4, 2017

(86) PCT No.: PCT/JP2017/028494
§ 371 (c)(1),
(2) Date: Oct. 1, 2018

(87) PCT Pub. No.: WO2018/026019
PCT Pub. Date: Feb. 8, 2018

(65) Prior Publication Data
US 2020/0394726 A1    Dec. 17, 2020

(30) Foreign Application Priority Data

Aug. 5, 2016    (JP) ................................. 2016-155103

(51) Int. Cl.
| G06Q 10/00 | (2023.01) |
| G01C 15/02 | (2006.01) |
| G06Q 50/08 | (2012.01) |
| E02F 9/26 | (2006.01) |

(52) U.S. Cl.
CPC ............. *G06Q 50/08* (2013.01); *G01C 15/02* (2013.01); *E02F 9/261* (2013.01)

(58) Field of Classification Search
CPC .......... G06Q 50/08; G06T 7/0004; G06T 7/00
See application file for complete search history.

(56) References Cited

U.S. PATENT DOCUMENTS 6,201,883 B1 *  3/2001  Mizui ..................... E02F 9/261
                                                 348/E13.008
2004/0215659 A1  10/2004  Singfield et al.
2006/0265914 A1  11/2006  Gudat
(Continued)

FOREIGN PATENT DOCUMENTS

| CN | 1794786 A | 6/2006 |
| CN | 102707332 A | 10/2012 |

(Continued)

OTHER PUBLICATIONS

Office Action dated Nov. 13, 2020, issued for the corresponding Chinese patent application No. 201780016276.0 and English translation thereof.
Office Action dated Mar. 26, 2019, issued for the corresponding Australian patent application No. 2017305111.

*Primary Examiner* — Brian M Epstein
*Assistant Examiner* — Reham K Abouzahra
(74) *Attorney, Agent, or Firm* — Locke Lord LLP

(57) ABSTRACT

A construction management system includes a geological data acquisition unit configured to acquire geological data of a work target, and a three-dimensional data acquisition unit configured to acquire three-dimensional data of the work target, where the three-dimensional data acquisition unit is configured to acquire, based on the geological data, three-dimensional data including a boundary between geologies of the work target.

8 Claims, 9 Drawing Sheets

(56) References Cited

U.S. PATENT DOCUMENTS

| | | | | |
|---|---|---|---|---|
| 2008/0239076 | A1* | 10/2008 | Luo | G06V 20/584 |
| | | | | 348/148 |
| 2010/0245347 | A1* | 9/2010 | Dorn | G01V 1/32 |
| | | | | 345/419 |
| 2012/0101796 | A1* | 4/2012 | Lindores | A01B 79/005 |
| | | | | 703/9 |
| 2015/0155007 | A1* | 6/2015 | Barfield, Jr. | G06T 15/20 |
| | | | | 386/278 |
| 2015/0278640 | A1* | 10/2015 | Johnson | G06V 20/188 |
| | | | | 382/110 |
| 2015/0310633 | A1* | 10/2015 | Nelan | G06T 7/0002 |
| | | | | 382/110 |
| 2016/0163088 | A1 | 6/2016 | Clar et al. | |
| 2016/0275211 | A1* | 9/2016 | Shuler | G06F 30/13 |
| 2016/0321763 | A1* | 11/2016 | Shike | G06Q 50/08 |
| 2017/0038749 | A1* | 2/2017 | Mewes | A01G 25/167 |

FOREIGN PATENT DOCUMENTS

| | | | | |
|---|---|---|---|---|
| CN | 104183017 | A | 12/2014 | |
| CN | 104331931 | A | 2/2015 | |
| IN | 204331743 | U | 5/2015 | |
| JP | 06-003145 | A | 1/1994 | |
| JP | H07-190767 | A | 7/1995 | |
| JP | 10-010690 | A | 1/1998 | |
| JP | 11-211473 | A | 8/1999 | |
| JP | 2000-034890 | A | 2/2000 | |
| JP | 2006-064585 | A | 3/2006 | |
| JP | 2008-267843 | A | 11/2008 | |
| JP | 2013-036243 | A | 2/2013 | |
| KR | 101581037 | B1 | 12/2015 | |
| WO | WO-2013170348 | A1 * | 11/2013 | E02F 9/261 |

\* cited by examiner

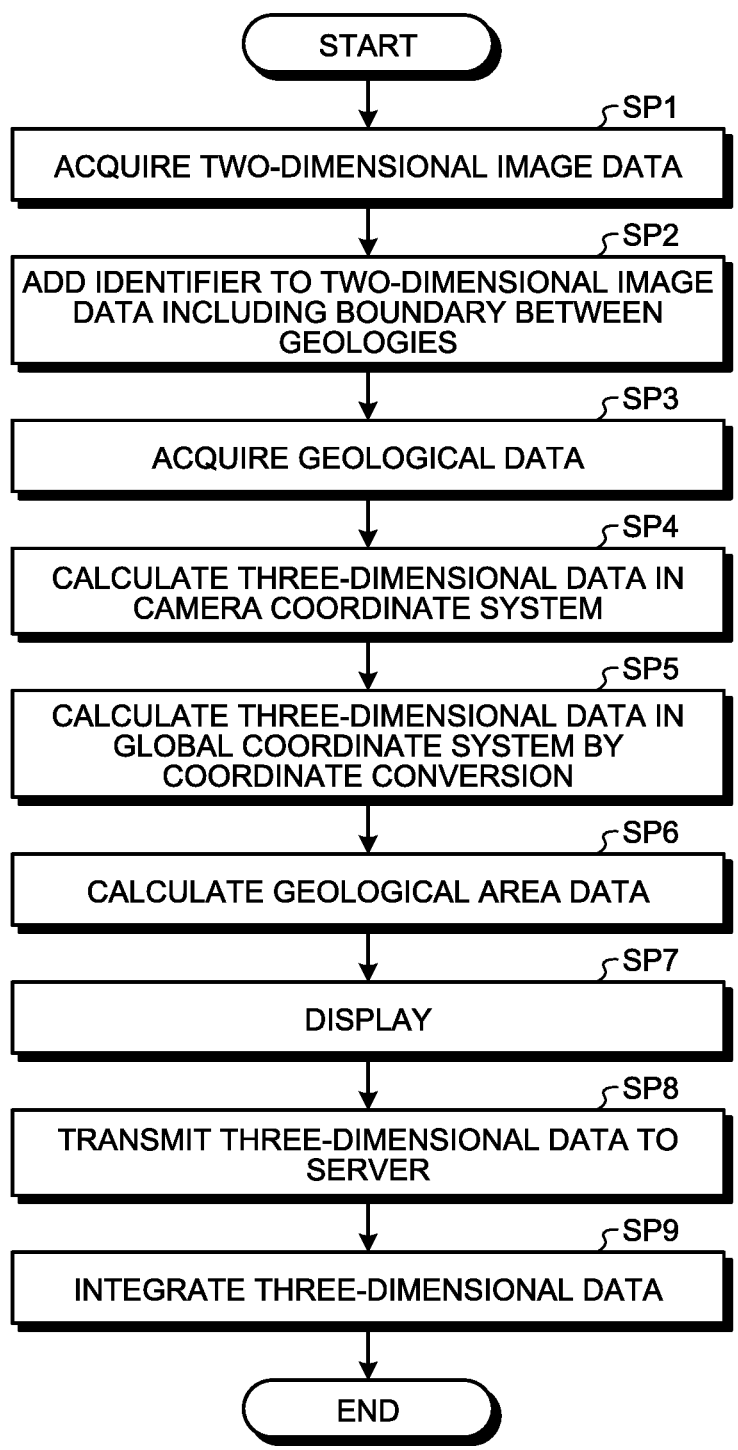

CONSTRUCTION MANAGEMENT SYSTEM

FIELD

The present invention relates to a construction management system.

BACKGROUND

There is known a work machine on which an imaging device is installed. Patent Literature 1 discloses a technique for creating construction plan image data based on construction plan data and position information of a stereo camera, for combining the construction plan image data and current state image data captured by the stereo camera, and for three-dimensionally displaying a combined synthetic image on a three-dimensional display device.

CITATION LIST

Patent Literature

Patent Literature 1: Japanese Laid-open Patent Publication No. 2013-036243 A

SUMMARY

Technical Problem

An amount of work that can be performed per unit time or a construction period is possibly varied depending on a geology of a work target. In the case of an easily workable geology, the amount of work is increased and the construction period is reduced. In the case of a geology which is not easy to work on, the amount of work is reduced and the construction period is increased. In this manner, the geology of a work target may affect the amount of work that can be performed per unit time or the construction period. Accordingly, the geology of a work target is investigated at a stage of construction planning, and data about the geology is acquired.

In the case where the geology investigated at the stage of construction planning and the geology which is recognized at a stage of carrying out construction are different, the geology has to be investigated again at the stage of carrying out construction. In the case where the geology of a work target is varied, a technique which is capable of efficiently acquiring three-dimensional data, including geological data, of a work target is desired.

An aspect of the present invention is aimed at providing a construction management system which is capable of efficiently acquiring three-dimensional data, including geological data, of a work target.

Solution to Problem

According to a first aspect of the present invention, a construction management system comprises: a two-dimensional image data acquisition unit configured to acquire two-dimensional image data of a target captured by an imaging device provided at a work machine; a three-dimensional data acquisition unit attached to the work machine and configured to acquire three-dimensional data of the target; an input unit configured to input geological data to the two-dimensional image data; and a geological data acquisition unit configured to add the input geological data to the three-dimensional data.

According to a second aspect of the present invention, a construction management system comprises: a two-dimensional image data acquisition unit configured to acquire two-dimensional image data of a target captured by an imaging device provided at a work machine; a position data acquisition unit configured to acquire position data at a time point at which the two-dimensional image data is captured by the imaging device; a geological data acquisition unit configured to acquire geological data about a geology of a ground surface included in the two-dimensional image data; and a storage unit configured to add, to the two-dimensional image data, the position data of the work machine at a time point at which the two-dimensional image data is acquired, the geological data of a ground surface included in the two-dimensional image data, and time point data about the time point at which the two-dimensional image data is acquired, and configured to store the two-dimensional image data.

According to a third aspect of the present invention, a construction management system comprises: a three-dimensional data acquisition unit attached to a work machine and configured to acquire three-dimensional data of a work target; and an event position data acquisition unit configured to acquire event position data indicating a position of an event occurring at the work target, wherein the three-dimensional data acquisition unit is configured to add information about the event and the event position data to the three-dimensional data acquired by the three-dimensional data acquisition unit.

Advantageous Effects of Invention

According to an aspect of the present invention, there is provided a construction management system which is capable of efficiently acquiring three-dimensional data, including geological data, of a work target.

BRIEF DESCRIPTION OF DRAWINGS

FIG. 10 is a flowchart illustrating an example of a construction management method according to the present embodiment.

DESCRIPTION OF EMBODIMENTS

Hereinafter, an embodiment according to the present invention will be described with reference to the drawings, but the present invention is not limited thereto. Structural elements of the embodiment described below may be combined as appropriate. Use of one or some of the structural elements may be omitted.

In the following description, a positional relationship of units will be described by defining a three-dimensional global coordinate system (Xg, Yg, Zg), a three-dimensional vehicle body coordinate system (Xm, Ym, Zm), and a three-dimensional camera coordinate system (Xs, Ys, Zs).

The global coordinate system is defined by an Xg-axis in a horizontal plane, a Yg-axis perpendicular to the Xg-axis in the horizontal plane, and a Zg-axis perpendicular to the Xg-axis and the Yg-axis. A direction parallel to the Xg-axis is taken as an Xg-axis direction, a direction parallel to the Yg-axis as a Yg-axis direction, and a direction parallel to the Zg-axis as a Zg-axis direction. A rotational or inclination direction relative to the Xg-axis is taken as a θXg direction, a rotational or inclination direction relative to the Yg-axis as a θYg direction, and a rotational or inclination direction relative to the Zg-axis as a θZg direction. The Zg-axis direction is a vertical direction.

The vehicle body coordinate system is defined by an Xm-axis extending in one direction with respect to an origin set on a vehicle body of a work machine, a Ym-axis perpendicular to the Xm-axis, and a Zm-axis perpendicular to the Xm-axis and the Ym-axis. A direction parallel to the Xm-axis is taken as an Xm-axis direction, a direction parallel to the Ym-axis as an Ym-axis direction, and a direction parallel to the Zm-axis as a Zm-axis direction. The Xm-axis direction is a front-back direction of the work machine, the Ym-axis direction is a vehicle width direction of the work machine, and the Zm-axis direction is a top-bottom direction of the work machine.

The camera coordinate system is defined by an Xs-axis extending in one direction with respect to an origin set on an imaging device, a Ys-axis perpendicular to the Xs-axis, and a Zs-axis perpendicular to the Xs-axis and the Ys-axis. A direction parallel to the Xs-axis is taken as an Xs-axis direction, a direction parallel to the Ys-axis as an Ys-axis direction, and a direction parallel to the Zs-axis as a Zs-axis direction. The Xs-axis direction is a top-bottom direction of the imaging device, the Ys-axis direction is a width direction of the imaging device, and the Zs-axis direction is a front-back direction of the imaging device. The Zs-axis direction is parallel to an optical axis of an optical system of the imaging device.

[Work Machine]

Figure 1:
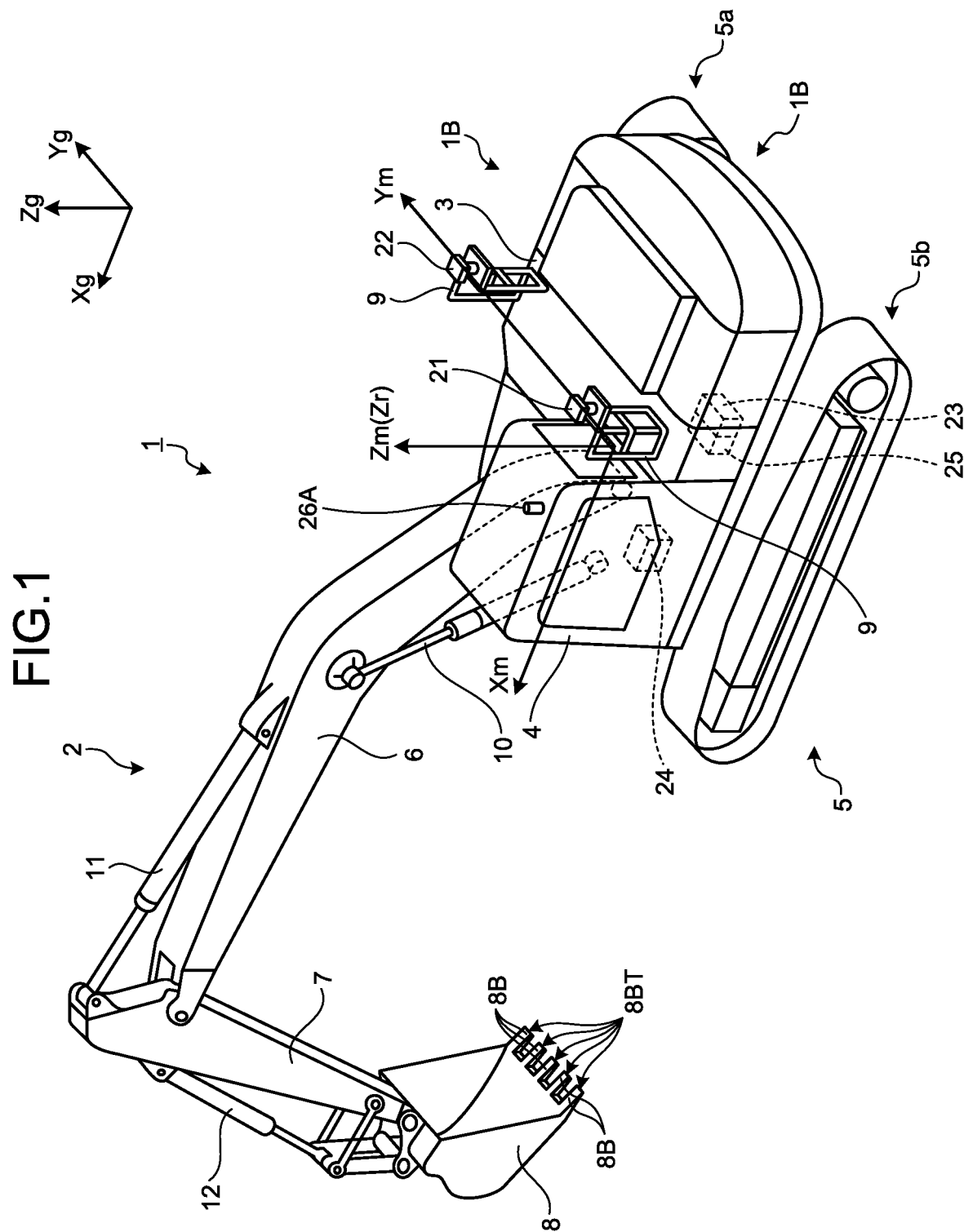
FIG. 1 is a perspective view illustrating an example of a work machine according to a present embodiment.

FIG. 1 is a perspective view illustrating an example of a work machine 1 according to the present embodiment. In the present embodiment, a description is given citing an excavator as an example of the work machine 1. In the following description, the work machine 1 is referred to as the excavator 1 as appropriate.

As illustrated in FIG. 1, the excavator 1 includes a vehicle body 1B and a work unit 2. The vehicle body 1B includes a swinging body 3, and a traveling body 5 which supports the swinging body 3 in a swingable manner.

The swinging body 3 is capable of swinging around a swing axis Zr. The swing axis Zr and the Zm-axis are parallel to each other. The swinging body 3 includes a cab 4. A hydraulic pump and an internal-combustion engine are arranged in the swinging body 3. The traveling body 5 includes crawler belts 5a, 5b. The excavator 1 travels by rotation of the crawler belts 5a, 5b.

The work unit 2 is coupled to the swinging body 3. The work unit 2 includes a boom 6 coupled to the swinging body 3, an arm 7 coupled to the boom 6, a bucket 8 coupled to the arm 7, a boom cylinder 10 for driving the boom 6, an arm cylinder 11 for driving the arm 7, and a bucket cylinder 12 for driving the bucket 8. The boom cylinder 10, the arm cylinder 11, and the bucket cylinder 12 are each a hydraulic cylinder, which is driven by hydraulic pressure.

The bucket 8 includes a plurality of blades 8B. The plurality of blades 8B are arranged in the Ym-axis direction of the vehicle body coordinate system. The blade 8B includes a blade tip 8BT. The blade tip 8BT is provided at a distal end part of the blade 8B. The bucket 8 is an example of a work tool. Additionally, the work tool to be coupled to the arm 7 is not limited to the bucket 8. The work tool to be coupled to the arm 7 may be a tilt bucket, a slope bucket, or a rock drill attachment including a rock drill tip, for example.

In the present embodiment, a position of the swinging body 3 defined in the global coordinate system (Xg, Yg, Zg) is detected. The global coordinate system is a coordinate system which takes an origin fixed in the earth as a reference. The global coordinate system is a coordinate system defined by a global navigation satellite system (GNSS). The GNSS refers to the global navigation satellite system. As an example of the global navigation satellite system, a global positioning system (GPS) may be cited. The GNSS includes a plurality of positioning satellites. The GNSS detects a position that is defined by coordinate data including latitude, longitude, and altitude.

The vehicle body coordinate system (Xm, Ym, Zm) is a coordinate system which takes an origin fixed in the swinging body 3 as a reference. The origin of the vehicle body coordinate system is a center of a swing circle of the swinging body 3, for example. The center of the swing circle is on the swing axis Zr of the swinging body 3. The Zm-axis of the vehicle body coordinate system coincides with the swing axis Zr of the swinging body 3. The Xm-axis direction is a front-back direction of the swinging body 3. The Ym-axis direction is a vehicle width direction of the swinging body 3. The Zm-axis direction is a top-bottom direction of the swinging body 3.

The excavator 1 includes a position detector 23 for detecting a position of the swinging body 3, a posture detector 24 for detecting a posture of the swinging body 3, and an orientation detector 25 for detecting an orientation of the swinging body 3.

The position detector 23 includes a GPS receiver. The position detector 23 is provided in the swinging body 3. The position detector 23 detects an absolute position of the swinging body 3, which is a position defined in the global coordinate system. The absolute position of the swinging body 3 includes coordinate data in the Xg-axis direction, coordinate data in the Yg-axis direction, and coordinate data in the Zg-axis direction.

A pair of GPS antennas 21, 22 are provided on the swinging body 3. In the present embodiment, the GPS antennas 21, 22 are provided on handrails 9 provided on an upper part of the swinging body 3. The GPS antennas 21, 22 are arranged in the Ym-axis direction of the vehicle body coordinate system. The GPS antennas 21, 22 are arranged with a specific distance therebetween. The GPS antennas 21, 22 receive radio waves from GPS satellites, and output, to the position detector 23, signals generated based on received radio waves. The position detector 23 detects absolute positions of the GPS antennas 21, 22, which are positions of the GPS antennas 21, 22 defined in the global coordinate system, based on the signals supplied from the GPS antennas 21, 22. The position detector 23 detects the absolute position of the swinging body 3 based on the absolute positions of the GPS antennas 21, 22.

The position detector 23 detects each of the absolute position of one GPS antenna 21, and the absolute position of the other GPS antenna 22. The position detector 23 calculates the absolute position of the swinging body 3 by performing a calculation process based on at least one of the absolute position of the GPS antenna 21 and the absolute position of the GPS antenna 22.

The posture detector 24 includes an inertial measurement unit (IMU). The posture detector 24 is provided in the swinging body 3. The posture detector 24 calculates an inclination angle of the swinging body 3 relative to a horizontal plane (XgYg plane) defined by the global coordinate system. The inclination angle of the swinging body 3 relative to the horizontal plane includes a roll angle θr indicating the inclination angle of the swinging body 3 in the Ym-axis direction (vehicle width direction), and a pitch angle θp indicating the inclination angle of the swinging body 3 in the Xm-axis direction (front-back direction).

The posture detector 24 detects acceleration and angular velocity applied to the posture detector 24. Acceleration and angular velocity applied to the swinging body 3 are detected by detection of the acceleration and angular velocity applied to the posture detector 24. The posture of the swinging body 3 is calculated based on the acceleration and angular velocity applied to the swinging body 3.

The orientation detector 25 calculates the orientation of the swinging body 3 relative to a reference orientation defined in the global coordinate system, based on the absolute position of one GPS antenna 21 and the absolute position of the other GPS antenna 22. The reference orientation is north, for example. The orientation detector 25 calculates the orientation of the swinging body 3 relative to the reference orientation, by performing a calculation process based on the absolute position of the GPS antenna 21 and the absolute position of the GPS antenna 22. The orientation detector 25 calculates a straight line connecting the absolute position of the GPS antenna 21 and the absolute position of the GPS antenna 22, and calculates the orientation of the swinging body 3 relative to the reference orientation based on an angle formed by the calculated straight line and the reference orientation. The orientation of the swinging body 3 relative to the reference orientation includes a yaw angle (orientation angle) θy indicating an angle formed by the reference orientation and the orientation of the swinging body 3.

[Imaging Device]

Figure 2:
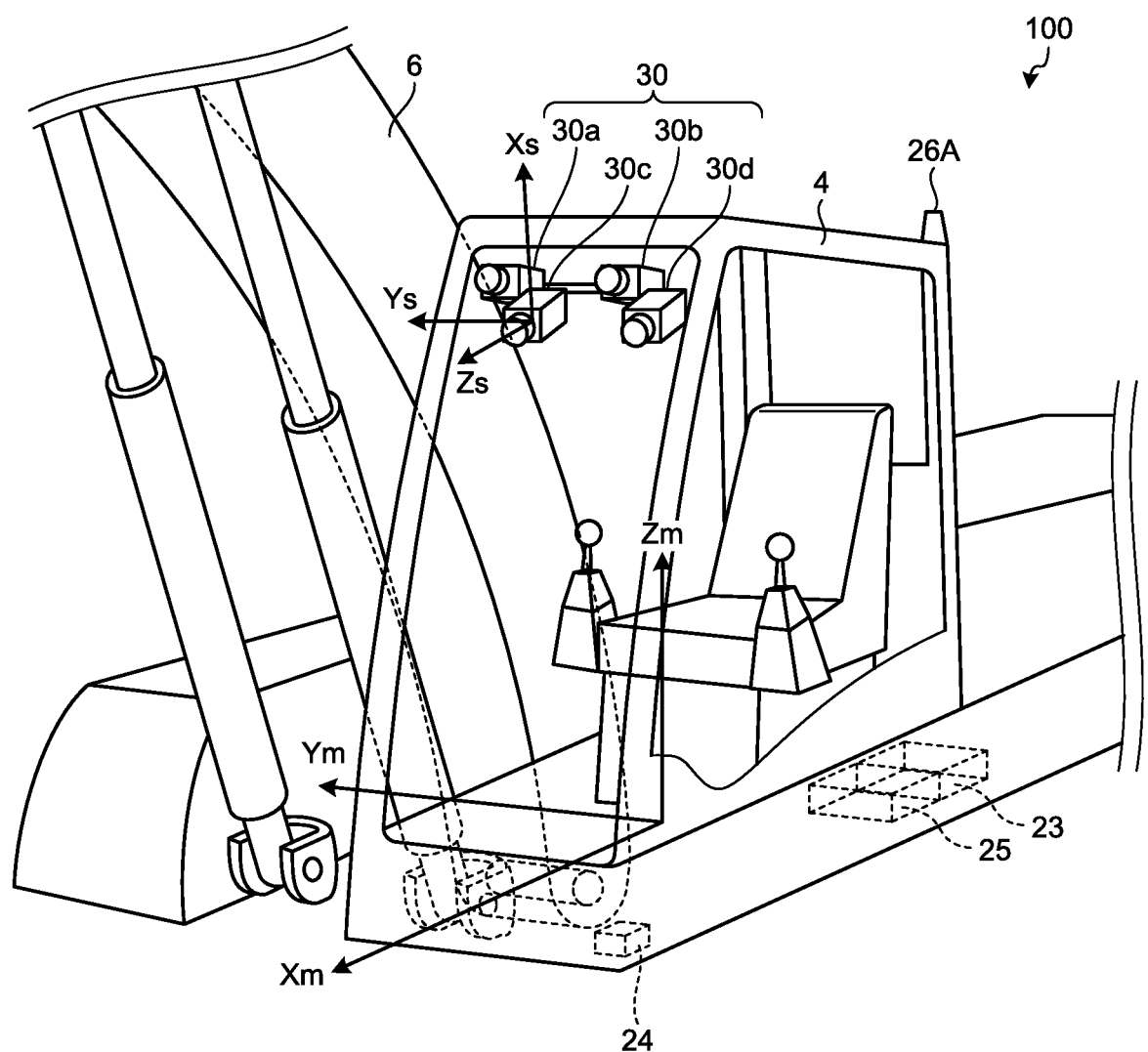
FIG. 2 is a perspective view illustrating an example of an imaging device according to the present embodiment.

FIG. 2 is a perspective view illustrating an example of an imaging device 30 according to the present embodiment. FIG. 2 is a perspective view of and around the cab 4 of the excavator 1.

As illustrated in FIG. 2, the excavator 1 includes the imaging device 30. The imaging device 30 is provided inside the cab 4. The imaging device 30 is arranged at a front (+Xm direction) and above (+Zm direction) in the cab 4.

The imaging device 30 captures an capturing target present in front of the swinging body 3. In the present embodiment, the capturing target includes a work target which is to be worked on at a construction site. The work target includes an excavation target which is to be excavated by the work unit 2 of the excavator 1. Additionally, the work target may be an excavation target which is to be excavated by the work unit 2 of another excavator lot (see FIG. 3), or may be a work target which is to be worked on by a work machine different from the excavator 1 including the imaging device 30. The work target may be a work target which is to be worked on by a worker.

The work target is a concept further including a work target which is not yet worked on, a work target which is being worked on, and a work target which has been worked on.

The imaging device 30 includes an optical system and an image sensor. The image sensor may be a couple charged device (CCD) image sensor, or a complementary metal oxide semiconductor (CMOS) image sensor. The imaging device 30 is capable of acquiring two-dimensional image data having an image quality which at least allows visual check of a geology of the work target. For example, in the case where the work target is formed from a plurality of different geologies, the imaging device 30 is capable of acquiring two-dimensional image data having an image quality which allows visual check of a boundary between the different geologies.

In the present embodiment, the imaging device 30 includes a plurality of imaging devices 30a, 30b, 30c, 30d. The imaging device 30a, 30c are arranged on a +Ym side (work unit 2 side) of the imaging devices 30b, 30d. The imaging device 30a and the imaging device 30b are arranged with a gap therebetween in the Ym-axis direction. The imaging device 30c and the imaging device 30d are arranged with a gap therebetween in the Ym-axis direction. The imaging devices 30a, 30b are arranged on a +Zm side of the imaging devices 30c, 30d. With respect to the Zm-axis direction, the imaging device 30a and the imaging device 30b are arranged at a substantially same position. With respect to the Zm-axis direction, the imaging device 30c and the imaging device 30d are arranged at a substantially same position.

A stereo camera is configured of a combination of two imaging devices 30 among the four imaging devices 30 (30a, 30b, 30c, 30d). The stereo camera refers to a camera which is capable of also acquiring data of a capturing target with respect to a depth direction, by simultaneously capturing the capturing target from different directions. In the present embodiment, a first stereo camera is configured of a combination of the imaging devices 30a, 30b, and a second stereo camera is configured of a combination of the imaging devices 30c, 30d.

In the present embodiment, the imaging devices 30a, 30b face upward (+Zm direction). The imaging devices 30c, 30d face downward (−Zm direction). Furthermore, the imaging devices 30a, 30c face forward (+Xm direction). The imaging devices 30b, 30d face slightly more towards the +Ym side (work unit 2 side) than forward. That is, the imaging devices 30a, 30c face front of the swinging body 3, and the imaging devices 30b, 30d face towards the imaging devices 30a, 30c. Alternatively, the imaging devices 30b, 30d may face front of the swinging body 3, and the imaging devices 30a, 30c may face towards the imaging devices 30b, 30d.

The imaging device 30 stereoscopically captures a capturing target present in front of the swinging body 3. In the present embodiment, three-dimensional data of a work target is calculated by three-dimensionally measuring the work target using stereoscopic two-dimensional image data from at least one pair of imaging devices 30. The three-dimensional data of the work target is three-dimensional data of a surface (land surface) of the work target. The three-dimensional data of the work target includes three-dimensional position data of the work target in the global coordinate system and three-dimensional shape data.

The camera coordinate system (Xs, Ys, Zs) is defined for each of the plurality of imaging devices 30 (30a, 30b, 30c, 30d). The camera coordinate system is a coordinate system which takes an origin fixed in the imaging device 30 as a reference. The Zs-axis of the camera coordinate system coincides with an optical axis of the optical system of the imaging device 30. The Xs-axis direction is the top-bottom direction of the imaging device 30. The Ys-axis direction is the width direction of the imaging device 30. The Zs-axis direction is the front-back direction of the imaging device 30. In the present embodiment, of the plurality of imaging devices 30a, 30b, 30c, 30d, the imaging device 30c is set as a reference imaging device.

[Construction Management System]

Figure 3:
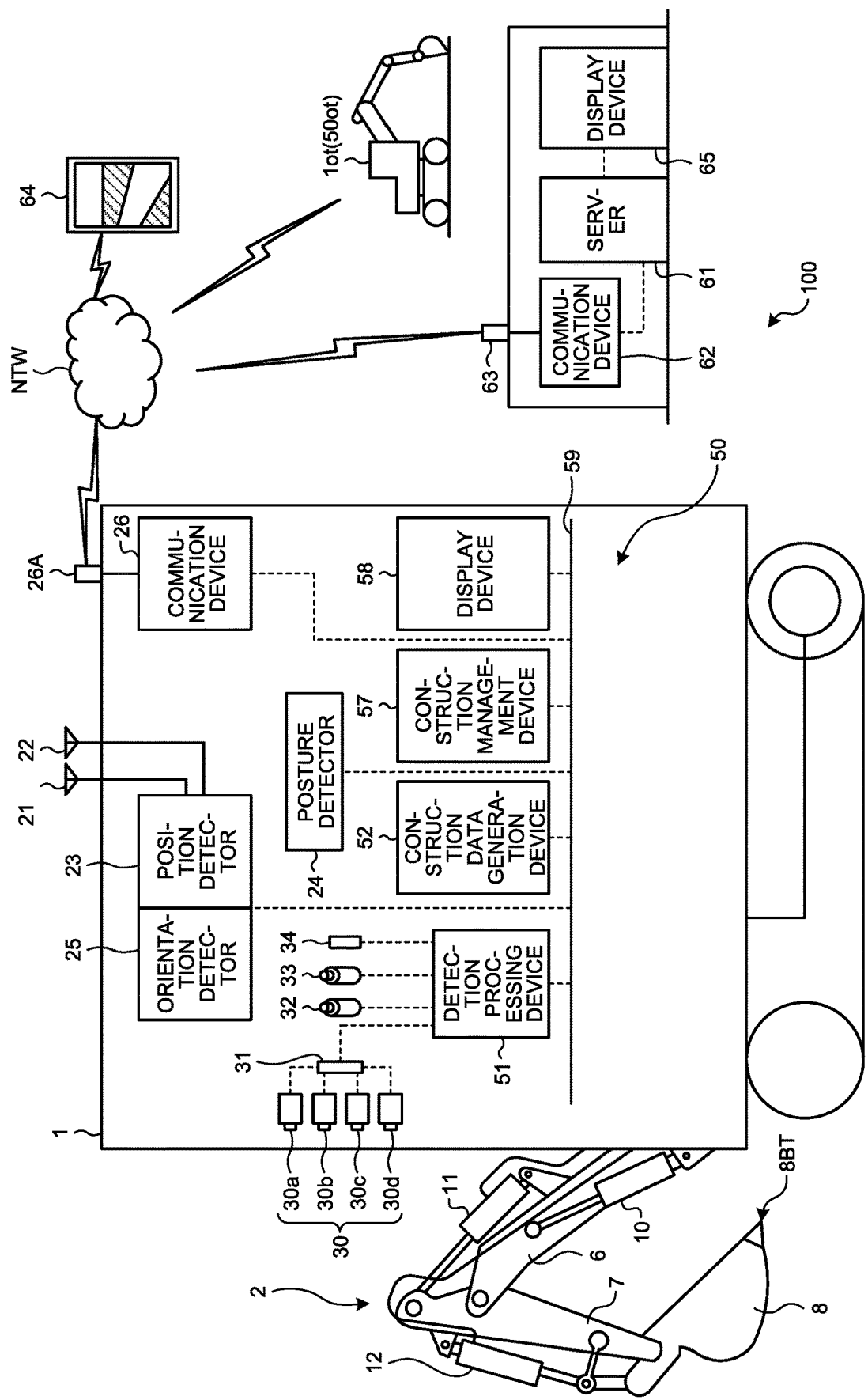
FIG. 3 is a diagram schematically illustrating an example of a control system of the work machine, and a construction management system according to the present embodiment.

FIG. 3 is a diagram schematically illustrating an example of a control system 50 of the excavator 1 according to the present embodiment, and a construction management system 100 including a server 61.

The control system 50 is disposed in the excavator 1. The server 61 is provided at a remote location from the excavator 1. The control system 50 and the server 61 are capable of performing data communication with each other over a communication network NTW. In addition to the control system 50 and the server 61, a mobile terminal device 64 and a control system 50ot of the other excavator lot are connected to the communication network NTW. The control system 50 of the excavator 1, the server 61, the mobile terminal device 64, and the control system 50ot of the other excavator lot are capable of performing data communication with one another over the communication network NTW. The communication network NTW includes at least one of a mobile telephone network and the Internet. The communication network NTW may also include a wireless LAN (Local Area Network).

The control system 50 includes a plurality of imaging devices 30 (30a, 30b, 30c, 30d), a detection processing device 51, a construction data generation device 52, a construction management device 57, a display device 58, and a communication device 26.

The control system 50 also includes the position detector 23, the posture detector 24, and the orientation detector 25.

The detection processing device 51, the construction data generation device 52, the construction management device 57, the display device 58, the communication device 26, the position detector 23, the posture detector 24, and the orientation detector 25 are connected to a signal line 59, and are capable of performing data communication with one another. A communication standard adopted by the signal line 59 is a controller area network (CAN), for example.

The control system 50 includes a computer system. The control system 50 includes an arithmetic processing device including a processor such as a central processing unit (CPU), and a storage device including a non-volatile memory such as a random access memory (RAM) and a volatile memory such as a random access memory (ROM). A communication antenna 26A is connected to the communication device 26. The communication device 26 is capable of performing data communication, over the communication network NTW, with at least one of the server 61, the mobile terminal device 64, and the control system 50ot of the other excavator lot.

The detection processing device 51 calculates three-dimensional data of a work target based on a pair of pieces of two-dimensional image data of the work target captured by at least one pair of imaging devices 30. The detection processing device 51 calculates three-dimensional data indicating coordinates of a plurality of parts of the work target in a three-dimensional coordinate system, by performing stereoscopic image processing on the pair of pieces of two-dimensional image data of the work target. The stereoscopic image processing refers to a method of obtaining a distance to a capturing target based on two images that are obtained by observing a same capturing target from two different imaging devices 30. The distance to the capturing target is expressed by a range image visualizing data about the distance to the capturing target using shading.

A hub 31, an imaging switch 32, an identifier adding switch 33, and an input unit 34 are connected to the detection processing device 51. The hub 31 is connected to the plurality of imaging devices 30a, 30b, 30c, 30d. Pieces of two-dimensional image data acquired by the imaging devices 30a, 30b, 30c, 30d are supplied to the detection processing device 51 through the hub 31. The hub 31 may be omitted.

The imaging switch 32 is installed in the cab 4. In the present embodiment, capturing of a work target by the imaging device 30 is performed, when the imaging switch 32 is operated by an operator in the cab 4.

The identifier adding switch 33 is installed in the cab 4. In the present embodiment, an identifier is added to two-dimensional image data acquired by the imaging device 30, when the identifier adding switch 33 is operated by the operator in the cab 4. As described later, the identifier is information indicating whether or not a boundary between geologies is included in the two-dimensional image data captured by the imaging device.

The input unit 34 includes a keyboard for a computer, a touch panel or the like.

The construction data generation device 52 generates aimed-at landform data indicating an aimed-at shape of a work target. In the present embodiment, the construction data generation device 52 generates the aimed-at landform data based on the three-dimensional data of the work target calculated by the detection processing device 51. The three-dimensional data of the work target calculated by the detection processing device 51 is current landform data indicating a current shape of the work target. The construction data generation device 52 generates the aimed-at landform data based on the current landform data of the work target. In the present embodiment, the aimed-at landform data is defined in the global coordinate system.

The construction management device 57 manages a state of the excavator 1, and a status of work of the excavator 1. For example, the construction management device 57 acquires completed work data indicating a result of work at an end stage of a day's work, and transmits the completed work data to at least one of the server 61 and the mobile terminal device 64. The construction management device 57 also acquires mid-work data indicating a result of work at a middle stage of a day's work, and transmits the mid-work data to at least one of the server 61 and the mobile terminal device 64.

The completed work data and the mid-work data include the three-dimensional data of the work target calculated by the detection processing device 51 based on the two-dimensional image data acquired by the imaging devices 30. That is, the current landform data of the work target at a middle stage of a day's work and at an end stage of a day's work are transmitted to at least one of the server 61 and the mobile terminal device 64.

The display device 58 includes a flat display panel such as a liquid crystal display (LCD) or an organic electroluminescence display (OELD).

The mobile terminal device 64 is possessed by a manager managing work of the excavator 1, for example.

The server 61 includes a computer system. The server 61 includes an arithmetic processing device including a processor such as a CPU, and a storage device including a non-volatile memory such as a RAM and a volatile memory such as a ROM. A communication device 62 and a display device 65 are connected to the server 61. The communication device 62 is connected to a communication antenna 63. The communication device 62 is capable of performing data communication, over the communication network NTW, with at least one of the control system 50 of the excavator 1, the mobile terminal device 64, and the control system 50ot of the other excavator lot.

Figure 4:
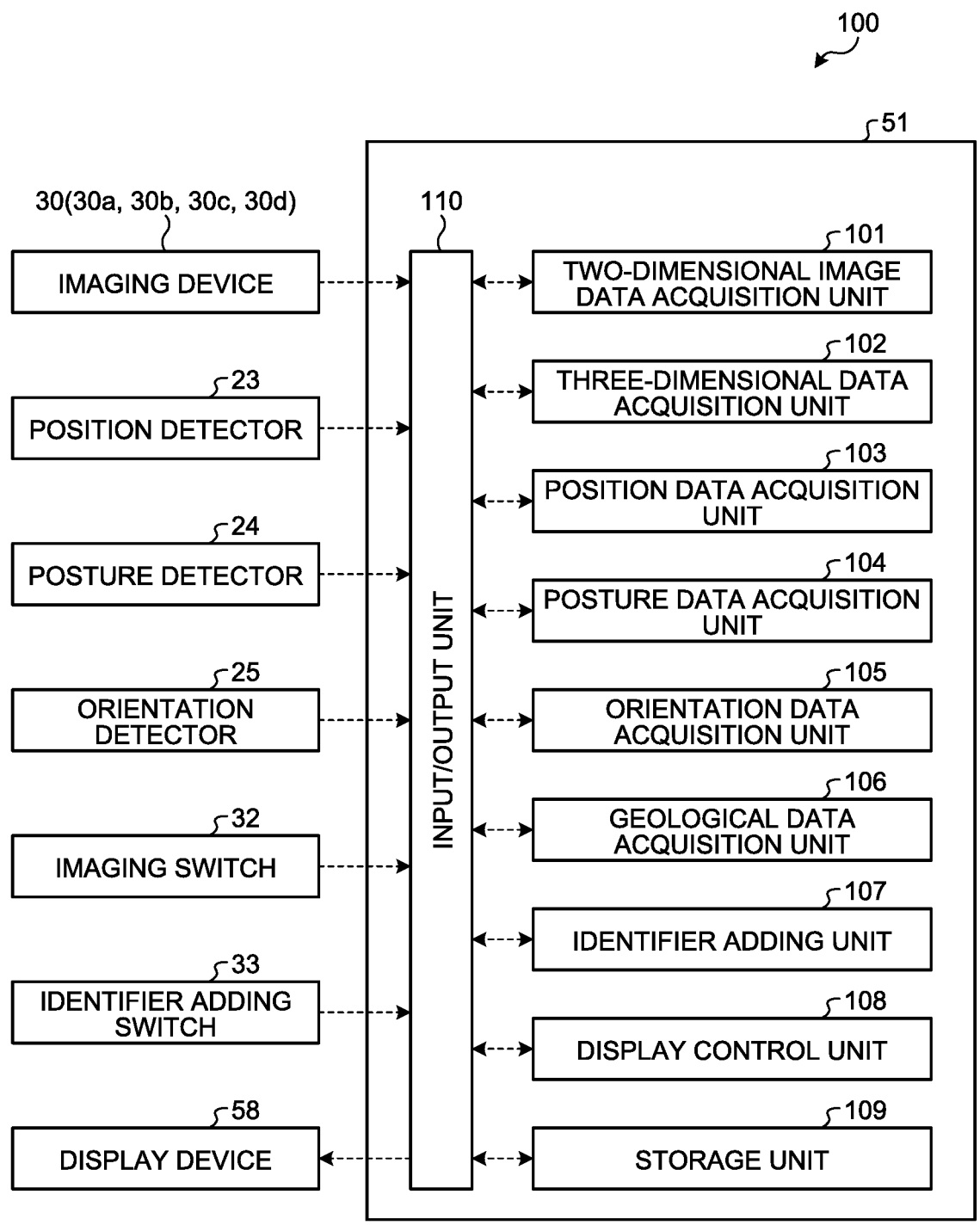
FIG. 4 is a functional block diagram illustrating an example of a detection processing device according to the present embodiment.

FIG. 4 is a functional block diagram illustrating an example of the detection processing device 51 according to the present embodiment. The detection processing device 51 includes a computer system including an arithmetic processing device including a processor, a storage device including a non-volatile memory and a volatile memory, and an input/output interface.

The detection processing device 51 includes a two-dimensional image data acquisition unit 101, a three-dimensional data acquisition unit 102, a position data acquisition unit 103, a posture data acquisition unit 104, an orientation data acquisition unit 105, a geological data acquisition unit 106, an identifier adding unit 107, a display control unit 108, a storage unit 109, and an input/output unit 110.

Functions of the two-dimensional image data acquisition unit 101, the three-dimensional data acquisition unit 102, the position data acquisition unit 103, the posture data acquisition unit 104, the orientation data acquisition unit 105, the geological data acquisition unit 106, the identifier adding unit 107, and the display control unit 108 are realized by the arithmetic processing device. A function of the storage unit 109 is realized by the storage device. A function of the input/output unit 110 is realized by the input/output interface.

Each structural element illustrated in FIG. 4 is capable of performing data communication through the input/output unit 110.

The two-dimensional image data acquisition unit 101 acquires, from at least one pair of imaging devices 30 provided at the excavator 1, pieces of two-dimensional image data of a work target captured by the pair of imaging devices 30. That is, the two-dimensional image data acquisition unit 101 acquires stereoscopic two-dimensional image data from at least one pair of imaging devices 30.

The three-dimensional data acquisition unit 102 acquires the three-dimensional data of the work target based on the two-dimensional image data acquired by the two-dimensional image data acquisition unit 101. The three-dimensional data acquisition unit 102 acquires three-dimensional position data of the work target in the camera coordinate system, based on the two-dimensional image data acquired by the two-dimensional image data acquisition unit 101.

The position data acquisition unit 103 acquires position data of the excavator 1 from the position detector 23. The position data of the excavator 1 includes position data indicating a position of the swinging body 3 in the global coordinate system detected by the position detector 23.

The posture data acquisition unit 104 acquires posture data of the excavator 1 from the posture detector 24. The posture data of the excavator 1 includes posture data indicating a posture of the swinging body 3 in the global coordinate system detected by the posture detector 24.

The orientation data acquisition unit 105 acquires orientation data of the excavator 1 from the orientation detector 25. The orientation data of the excavator 1 includes orientation data indicating an orientation of the swinging body 3 in the global coordinate system detected by the orientation detector 25.

The three-dimensional data acquisition unit 102 calculates the three-dimensional data of the work target in the global coordinate system based on the position data of the swinging body 3 acquired by the position data acquisition unit 103, the posture data of the swinging body 3 acquired by the posture data acquisition unit 104, the orientation data of the swinging body 3 acquired by the orientation data acquisition unit 105, and the two-dimensional image data of the work target acquired by the two-dimensional image data acquisition unit 101. The three-dimensional data of the work target in the global coordinate system includes the three-dimensional position data of the work target in the global coordinate system. The three-dimensional data acquisition unit 102 performs coordinate conversion on the three-dimensional data of the work target in the camera coordinate system based on the position data of the swinging body 3, the posture data of the swinging body 3, and the orientation data of the swinging body 3, and thereby calculates the three-dimensional data of the work target in the global coordinate system.

The geological data acquisition unit 106 acquires geological data of the work target. The geological data of the work target includes various pieces of data about geology, such as a geology of the work target, soil properties (clayey, decomposed granite, etc.), a rock quality, and stiffness of ground. The geological data also includes information about a boundary between geologies of the work target, or more specifically, a position of the boundary. The boundary between geologies of the work target includes a boundary between a first geological area and a second geological area having a different geology from the first geological area.

The geological data acquisition unit 106 acquires input data generated by operation on the input unit 34. For example, the input unit 34 is operated by the operator in the cab 4. When the input unit 34 is operated by the operator, input data for specifying the geological data of the work target is generated. The geological data acquisition unit 106 acquires the geological data from the input unit 34.

In the present embodiment, the operator looks at the two-dimensional image data of the work target acquired by the two-dimensional image data acquisition unit 101 and displayed on the display device 58, specifies a position of a boundary between geologies of the work target, operates the input unit 34, and inputs, at a boundary position of the geologies in the two-dimensional image data of the work target, boundary data indicating presence of a boundary. Information about the boundary position of the geologies may thereby be reflected on the three-dimensional data of the work target, and be stored.

Furthermore, the operator operates the input unit 34, and inputs geological data (geology, soil properties, rock quality) with respect to a geological region defined based on the boundary between the geologies, or in other words, a region of ground having a same geology. Input geological data may thereby be stored with respect to a certain geological region on the three-dimensional data of the work target. Additionally, the operator inputs different pieces of geological data with respect to one side of the boundary and the other side of the boundary.

The three-dimensional data is formed of elements which are provided at predetermined intervals, such as cells. As a method for storing the geological data in the three-dimensional data, the geological data may be stored in units of geological regions defined based on the boundary between geologies, or the geological data may be stored in units of elements (partial regions).

Ground stiffness information may be stored, as the geological data, in the three-dimensional data. For example, the ground stiffness information may be stored together with the geological data stored for a certain geological region.

The identifier adding unit 107 adds an identifier to the two-dimensional image data including a boundary between soil properties of the work target, based on input data generated by operation of the identifier adding switch 33. In the case of determining that a boundary between geologies of the work target is included in the two-dimensional image data of the work target acquired by the two-dimensional image data acquisition unit 101 and displayed on the display device 58, the operator may operate the identifier adding switch 33, and add an identifier to the two-dimensional image data including the boundary between geologies of the work target.

In the following description, the two-dimensional image data to which the identifier is added will be referred to as specified two-dimensional image data as appropriate.

The three-dimensional data acquisition unit 102 acquires three-dimensional data of the boundary between geologies of the work target based on the specified two-dimensional image data to which the identifier is added and a pair of pieces of two-dimensional image data to be stereoscopically processed.

Furthermore, the three-dimensional data acquisition unit 102 combines three-dimensional data formed from a plurality of pieces of specified two-dimensional image data, and acquires three-dimensional data of a region of a specific geology.

The display control unit 108 causes the display device 58 to display the three-dimensional data of the work target calculated by the three-dimensional data acquisition unit 102. The display control unit 108 also causes the display device 58 to display the three-dimensional data including the boundary data regarding the geologies acquired by the three-dimensional data acquisition unit 102. The display control unit 108 also causes the display device 58 to display geological area data acquired by the three-dimensional data acquisition unit 102. The display control unit 108 converts the three-dimensional data of the work target acquired by the three-dimensional data acquisition unit 102 and the geological area data into display data in a display format which can be displayed on the display device 58, and causes the display device 58 to display the display data.

[Capturing of Work Target and Generation of Shape Data]

Figure 5:
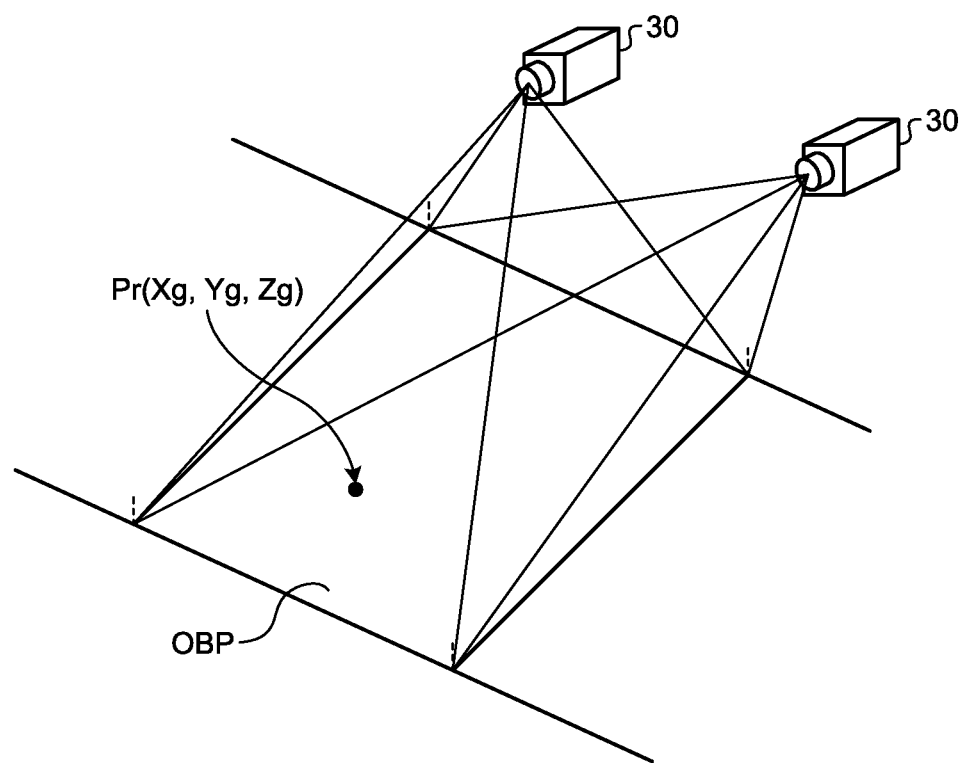
FIG. 5 is a schematic diagram illustrating an example of processing by the imaging devices and the detection processing device according to the present embodiment.

FIG. 5 is a schematic diagram illustrating an example of processing by the imaging devices 30 and the detection processing device 51 according to the present embodiment. In the following description, a work target OBP is assumed to be a part of a construction site which is worked on by the work unit 2 of the excavator 1. Additionally, as described above, the work target OBP may be a work target which is worked on by at least one of the other excavator lot, a work machine different from the excavator 1, and a worker. The work target OBP may be a work target which is not yet worked on, or may alternatively be a work target which is being worked on or a work target which has been worked on.

The work target OBP is in front of the swinging body 3. The work target OBP is captured by at least one pair of imaging devices 30. In the present embodiment, capturing by the imaging devices 30 is performed when the operator of the excavator 1 in the cab 4 operates the imaging switch 32. Input data which is a capturing command, which is generated by operation of the imaging switch 32, is supplied to the detection processing device 51. The detection processing device 51 causes the imaging devices 30 to capture the work target OBP, based on the input data supplied by the imaging switch 32.

Two-dimensional image data of the work target OBP captured by at least one pair of imaging devices 30 is acquired by the two-dimensional image data acquisition unit 101 of the detection processing device 51. The three-dimensional data acquisition unit 102 performs stereoscopic image processing on the two-dimensional image data of the work target OBP captured by the at least one pair of imaging devices 30 and acquired by the two-dimensional image data acquisition unit 101, and acquires three-dimensional data of the work target OBP. The three-dimensional data which is acquired based on the two-dimensional image data acquired by the two-dimensional image data acquisition unit 101 is three-dimensional data in the camera coordinate system. The three-dimensional data in the camera coordinate system is converted into three-dimensional data in the global coordinate system. The three-dimensional data acquisition unit 102 converts the three-dimensional data in the camera coordinate system into the three-dimensional data in the global coordinate system based on the posture data of the excavator 1 acquired by the posture data acquisition unit 104.

The three-dimensional data acquisition unit 102 acquires a position Ps(xs, ys, zs) of the work target OBP in the camera coordinate system based on the two-dimensional image data captured by the at least one pair of imaging devices 30, and converts the position into a position Pg(xg, yg, zg) in the global coordinate system.

In this manner, the three-dimensional data acquisition unit 102 performs coordinate conversion on the three-dimensional data of the work target OBP, in the camera coordinate system, acquired based on the two-dimensional image data acquired by the two-dimensional image data acquisition unit 101, by using the position data of the excavator 1 acquired by the position data acquisition unit 103, the posture data of the excavator 1 acquired by the posture data acquisition unit 104, and the orientation data of the excavator 1 acquired by the orientation data acquisition unit 105, and the three-dimensional data of the work target OBP in the global coordinate system may thus be acquired.

The three-dimensional data acquisition unit 102 acquires a position Pr(Xg, Yg, Zg) on a surface of the work target OBP with respect to an entire region of the work target OBP captured by the at least one pair of imaging devices 30.

[Three-Dimensional Data Including Geological Data]

Figure 6:
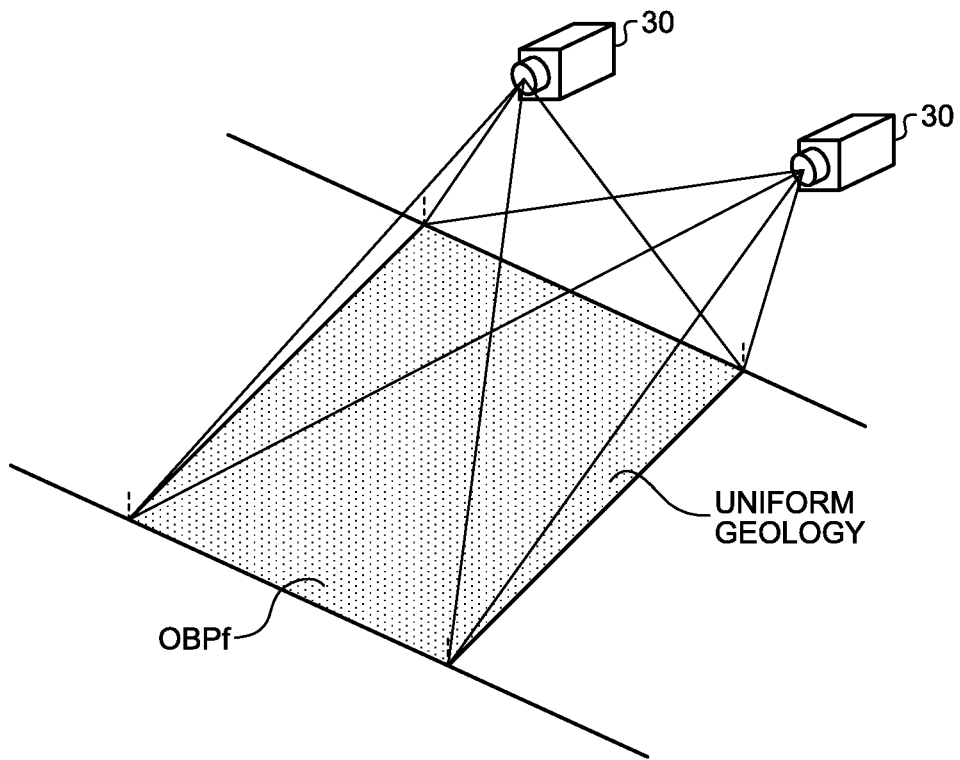
FIG. 6 is a diagram schematically illustrating a work target with a uniform geology.
Figure 7:
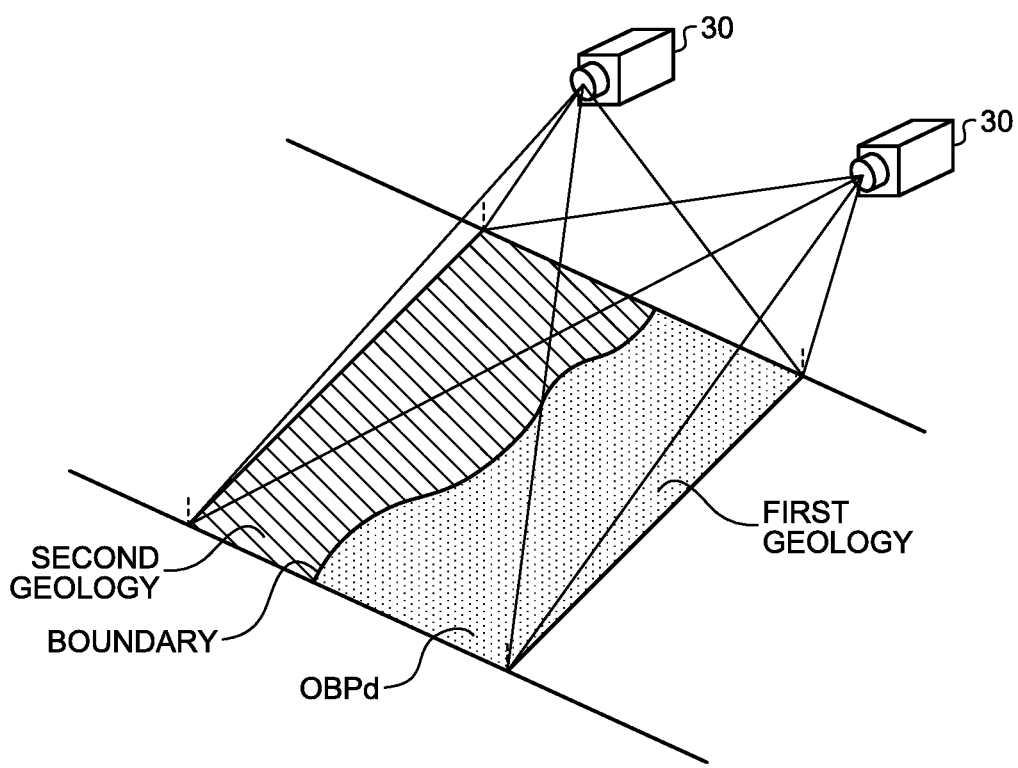
FIG. 7 is a diagram schematically illustrating a work target with varying geologies.

FIG. 6 is a diagram schematically illustrating a work target OBPf with a uniform geology. FIG. 7 is a diagram schematically illustrating a work target OBPd with varying geologies. As illustrated in FIGS. 6 and 7, a construction site possibly includes a work target OBPf with a uniform geology and a work target OBPd with varying geologies.

In the present embodiment, the three-dimensional data acquisition unit 102 acquires three-dimensional data of a region including a boundary between geologies of the work target OBPd with varying geologies. For example, in the case where the work target OBPd includes a first geology and a second geology, as illustrated in FIG. 7, the three-dimensional data acquisition unit 102 acquires three-dimensional data of a region including a boundary between the first geology and the second geology. The boundary between geologies is a boundary between geologies at a surface (land surface) of the work target OBPd. The three-dimensional data of the region including the boundary between geologies is three-dimensional data of the region including the boundary between the geologies at the surface (land surface) of the work target OBPd.

Figure 8:
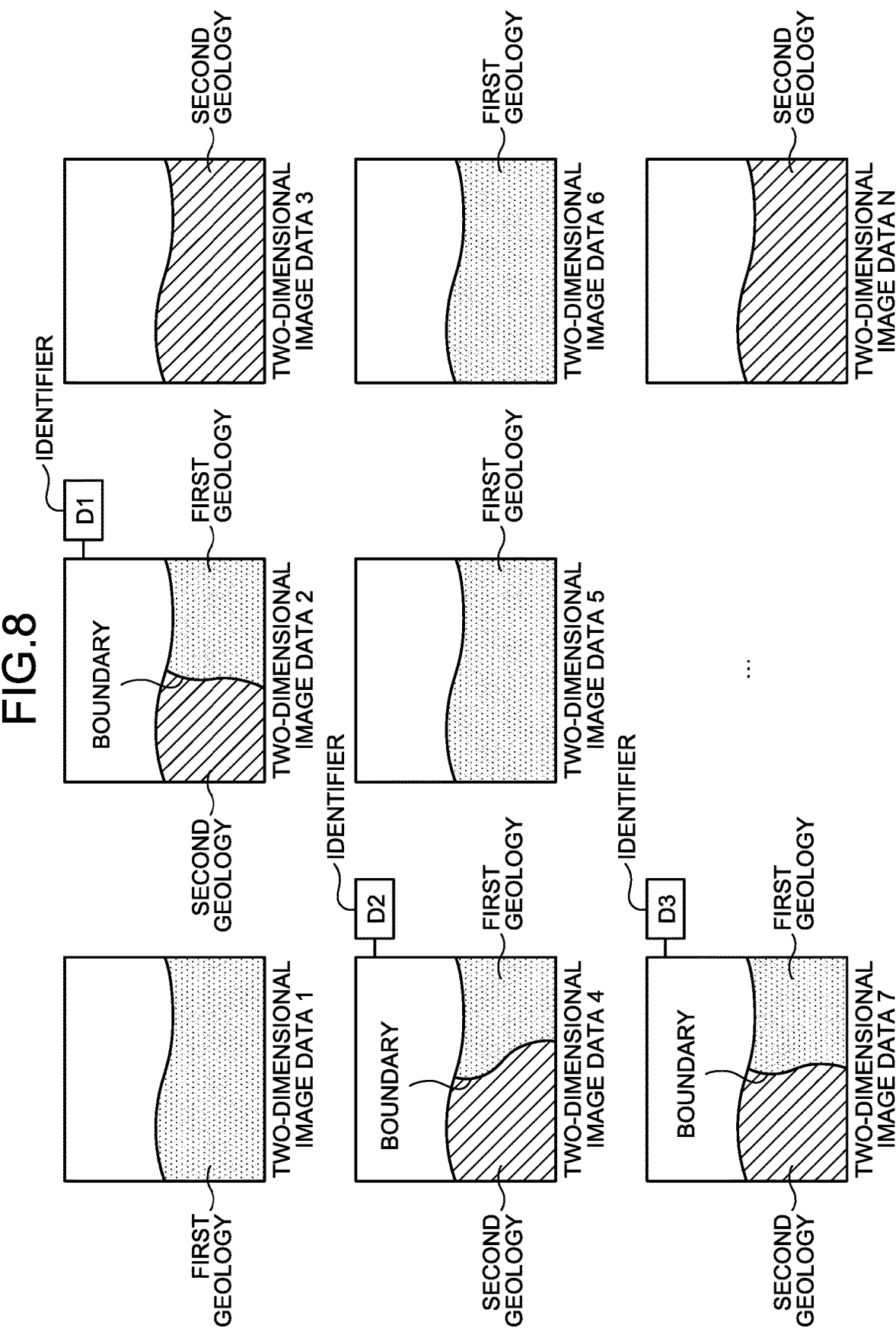
FIG. 8 is a diagram schematically illustrating examples of two-dimensional image data acquired by a two-dimensional image data acquisition unit according to the present embodiment.

FIG. 8 is a diagram schematically illustrating examples of two-dimensional image data acquired by the two-dimensional image data acquisition unit 101 according to the present embodiment. The operator changes positions or orientations of the imaging devices 30 by at least one of swinging of the swinging body 3 and traveling of the traveling body 5, and captures each of a plurality of work targets OBP at a construction site by the imaging devices 30. The two-dimensional image data is thereby acquired for each of the plurality of work targets OBP at the construction site. As described above, pieces of the two-dimensional image data of the work target OBP are acquired by the imaging devices 30 by operation of the imaging switch 32 by the operator.

The two-dimensional image data acquisition unit 101 acquires a plurality of pieces of two-dimensional image data for each of the plurality of work targets OBP. FIG. 8 illustrates an example where N pieces of two-dimensional image data are acquired by the two-dimensional image data acquisition unit 101.

In the example illustrated in FIG. 8, two-dimensional image data 1 is two-dimensional image data not including a boundary between geologies. Two-dimensional image data 2 is two-dimensional image data including a boundary between geologies. Two-dimensional image data 3 is two-dimensional image data not including a boundary between geologies. Two-dimensional image data 4 is two-dimensional image data including a boundary between geologies. Two-dimensional image data 5 is two-dimensional image data not including a boundary between geologies. Two-dimensional image data 6 is two-dimensional image data not including a boundary between geologies. Two-dimensional image data 7 is two-dimensional image data including a boundary between geologies. Two-dimensional image data N is two-dimensional image data not including a boundary between geologies.

The identifier adding unit 107 adds an identifier to two-dimensional image data including a boundary between geologies of the work target, based on operation of the identifier adding switch 33 by the operator in the cab 4. In the example illustrated in FIG. 8, identifiers D1, D2, D3 are added to the two-dimensional image data 2, the two-dimensional image data 4, and the two-dimensional image data 7. Identifiers are not added to the two-dimensional image data 1, the two-dimensional image data 3, the two-dimensional image data 5, the two-dimensional image data 6, and the two-dimensional image data N.

The two-dimensional image data 1 to the two-dimensional image data N acquired by the two-dimensional image data acquisition unit 101 are displayed on the display device 58. The operator visually checks the display device 58, and determines whether or not a boundary between geologies is included in the pieces of two-dimensional image data displayed on the display device 58.

As described above, in the present embodiment, the imaging device 30 is capable of acquiring two-dimensional image data having an image quality which allows visual check of a boundary between different geologies. Accordingly, the operator may determine whether or not a boundary between geologies is included in the two-dimensional image data by visually checking the two-dimensional image data.

Additionally, in the case where determination by visual check is difficult, the geologies may be investigated in detail prior to capturing and a boundary line between the geologies may be determined, and then, capturing by the imaging device 30 may be performed in a state where a mark is provided at the boundary between the geologies of the work target OBP. The mark may be colored powder sprayed along the boundary between the geologies, bar members arranged with predetermined gaps along the boundary between the geologies, or reflection members arranged with predetermined gaps along the boundary of the geologies. When the two-dimensional image data of the work target OBP is acquired by the imaging device 30 in a state where a mark is provided at the boundary between the geologies, the operator may easily determine whether or not the boundary between the geologies is included in the two-dimensional image data, by visually checking the mark included in the two-dimensional image data.

When determining that a boundary between geologies is included in two-dimensional image data, by visually checking the two-dimensional image data displayed on the display device 58, the operator operates the identifier adding switch 33. Input data generated by operation of the identifier adding switch 33 is supplied to the identifier adding unit 107. The identifier adding unit 107 adds an identifier to the two-dimensional image data including the boundary between the geologies of the work target based on the input data generated at the identifier adding switch 33.

For example, in the example illustrated in FIG. 8, when the two-dimensional image data 2 is displayed on the display device 58, the operator visually checks the display device 58, determines that a boundary between geologies is included in the two-dimensional image data 2 displayed on the display device 58, and operates the identifier adding switch 33. The identifier D1 is thereby added to the two-dimensional image data 2. In the same manner, when the two-dimensional image data 4 is displayed on the display device 58, the identifier adding switch 33 is operated by the operator, and the identifier D2 is added to the two-dimensional image data 4. In the same manner, when the two-dimensional image data 7 is displayed on the display device 58, the identifier adding switch 33 is operated by the operator, and the identifier D3 is added to the two-dimensional image data 7.

For example, when the two-dimensional image data 1 is displayed on the display device 58, the operator visually checks the display device 58, determines that a boundary between geologies is not included in the two-dimensional image data 1 displayed on the display device 58, and does not operate the identifier adding switch 33. Accordingly, an identifier is not added to the two-dimensional image data 1. The same thing can be said for the two-dimensional image data 3, 5, 6, N.

Specified two-dimensional image data, which is two-dimensional image data to which an identifier is added, is stored in the storage unit 109. In the example illustrated in FIG. 8, for the sake of simplicity, three pieces of two-dimensional image data 2, 4, 7 are assumed to be the specified two-dimensional image data. In reality, a large number of pieces of specified two-dimensional image data are stored in the storage unit 109. Two-dimensional image data to which an identifier is not added is also stored in the storage unit 109.

The specified two-dimensional image data to which an identifier is added is transmitted to the server 61 over the communication network NTW. The two-dimensional image data to which an identifier is not added is also transmitted to the server 61 over the communication network NTW.

The operator looks at the specified two-dimensional image data 2, 4, 7 displayed on the display device 58, determines a position of a boundary between geologies in the specified two-dimensional image data 2, 4, 7, operates the input unit 34, and inputs boundary data indicating the position of the boundary between the geologies in the specified two-dimensional image data 2, 4, 7. Furthermore, the operator looks at the specified two-dimensional image data 2, 4, 7 displayed on the display device 58, and inputs, by the input unit 34, first geological data indicating a first geology and second geological data indicating a second geology, the first geology and the second geology forming the boundary. The operator also looks at the two-dimensional image data 1, 3, 5, 6, N displayed on the display device 58, and inputs, by the input unit 34, geological data displayed on the display device 58.

The three-dimensional data acquisition unit 102 acquires three-dimensional data including the boundary between the geologies in the camera coordinate system, based on the specified two-dimensional image data. The boundary between the first geological area and the second geological area is reflected in the acquired three-dimensional data by stereoscopic processing being performed based on the specified two-dimensional image data including the boundary data, and the first geological area and the second geological area are specified.

That is, in the present embodiment, the three-dimensional data of the work target includes three-dimensional data of the first geological area including the first geological data, the three-dimensional data of the second geological area including the second geological data, and the boundary data indicating the boundary between the first geological area and the second geological area.

Furthermore, the three-dimensional data acquisition unit 102 acquires three-dimensional data of the boundary between the geologies in the global coordinate system by performing coordinate conversion on the three-dimensional data of the boundary between the geologies in the camera coordinate system, based on the position data of the excavator 1 acquired by the position data acquisition unit 103, the posture data of the excavator 1 acquired by the posture data acquisition unit 104, and the orientation data of the excavator 1 acquired by the orientation data acquisition unit 105. The three-dimensional data of the boundary between the geologies in the global coordinate system is also stored in the storage unit 109.

The three-dimensional data indicating the boundary between the geologies in the global coordinate system, acquired by the three-dimensional data acquisition unit 102, is transmitted to the server 61 over the communication network NTW. The three-dimensional data of the work target OBP in the global coordinate system, not including the boundary between the geologies, is also transmitted to the server 61 over the communication network NTW.

The three-dimensional data acquisition unit 102 combines the three-dimensional data including the boundary between the geologies, stored in the storage unit 109, and thereby acquires specific geological area data. In the case where there are a plurality of pieces of three-dimensional data of the boundary between the geologies, which are defined in the global coordinate system, the three-dimensional data acquisition unit 102 may join the plurality of pieces of three-dimensional data of the boundary between the geologies, and acquire the specific geological area data. For example, in the example illustrated in FIG. 8, the three-dimensional data acquisition unit 102 joins a plurality of pieces of specified two-dimensional image data including the first geology and the second geology, and may thereby acquire the first geological area data or the second geological area data.

Figure 9:
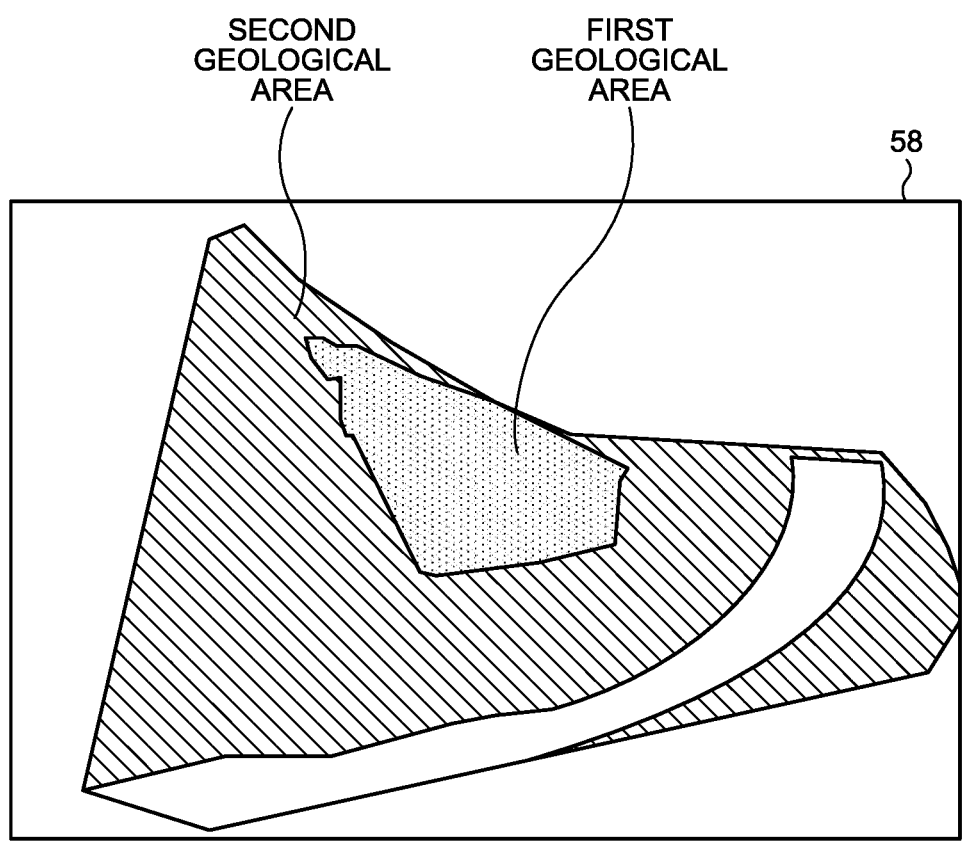
FIG. 9 is a diagram schematically illustrating an example of a display device displaying geological area data according to the present embodiment.

The display control unit 108 causes the display device 58 to display the acquired geological area data. FIG. 9 is a diagram schematically illustrating an example of the display device 58 displaying the geological area data according to the present embodiment. For example, the three-dimensional data acquisition unit 102 acquires the geological area data based on the pieces of specified two-dimensional image data 2, 4, 7 and a plurality of pieces of specified two-dimensional image data which include the first geology and the second geology and which are approximate to the pieces of specified two-dimensional image data 2, 4, 7. As illustrated in FIG. 9, the display control unit 108 causes the display device 58 to display the geological area data acquired by the three-dimensional data acquisition unit 102. The display control unit 108 may also cause the display device 58 to display the three-dimensional data of the boundary between the geologies acquired by the three-dimensional data acquisition unit 102.

[Construction Management Method]

Next, an example of a construction management method according to the present embodiment will be described. FIG. 10 is a flowchart illustrating an example of the construction management method according to the present embodiment.

A plurality of work targets OBP at a construction site are captured by the imaging device 30. The two-dimensional image data acquisition unit 101 acquires two-dimensional image data of the plurality of work targets OBP from the imaging device 30 (step SP1).

The two-dimensional image data of the work target OBP acquired by the two-dimensional image data acquisition unit 101 is displayed on the display device 58. The operator of the excavator 1 visually checks the two-dimensional image data displayed on the display device 58, and determines whether or not a boundary between geologies of the work target is included in the two-dimensional image data. In the case of determining that a boundary between geologies of the work target is included in the two-dimensional image data, the operator operates the identifier adding switch 33.

When the identifier adding switch 33 is operated, the identifier adding unit 107 adds an identifier to the two-dimensional image data (step SP2).

The operator of the excavator 1 also visually checks the two-dimensional image data displayed on the display device 58, and specifies the geology of the work target in the two-dimensional image data. After specifying the geology of the work target in the two-dimensional image data, the operator operates the input unit 34, and inputs geological data of the work target.

The geological data includes the boundary data indicating the position of the boundary between the geologies. The operator specifies the position of the boundary between the geologies of the work target in the two-dimensional image data. After specifying the position of the boundary between the geologies, the operator operates the input unit 34, and inputs the boundary data indicating the position of the boundary in the data.

The geological data which is generated by operation of the input unit 34, and which includes the boundary data regarding the geologies is acquired by the geological data acquisition unit 106 (step SP3).

The three-dimensional data acquisition unit 102 acquires three-dimensional data including the geological data in the camera coordinate system by stereoscopically processing a plurality of images captured by the imaging devices 30 (step SP4).

The position data of the swinging body 3 is acquired by the position data acquisition unit 103. The posture data of the swinging body 3 is acquired by the posture data acquisition unit 104. The orientation data of the swinging body 3 is acquired by the orientation data acquisition unit 105. The three-dimensional data acquisition unit 102 acquires the three-dimensional data of the work target in the global coordinate system by performing coordinate conversion on the three-dimensional data of the work target in the camera coordinate system based on the position data, the posture data, and the orientation data of the swinging body 3 (step SP5).

The three-dimensional data acquisition unit 102 also acquires specific geological area data by combining a plurality of pieces of specified two-dimensional image data (step SP6).

The display control unit 108 causes the display device 58 to display the acquired geological area data (step SP7).

The three-dimensional data of the work target in the global coordinate system acquired in step SP5 is transmitted from the control system 50 of the excavator 1 to the server 61 over the communication network NTW (step SP8).

The geological area data acquired in step SP6 is also transmitted from the control system 50 of the excavator 1 to the server 61 over the communication network NTW.

The specified two-dimensional image data including the boundary between the geologies in the global coordinate system, and the two-dimensional image data not including the boundary between the geologies in the global coordinate system are also transmitted from the control system 50 of the excavator 1 to the server 61 over the communication network NTW. For example, the specified two-dimensional image data including the boundary between the geologies in the global coordinate system is two-dimensional image data which is acquired by performing coordinate conversion on specified two-dimensional image data such as the two-dimensional image data 2, 4, 7 described with reference to FIG. 8. The two-dimensional image data not including the boundary between the geologies in the global coordinate system is two-dimensional image data acquired by performing coordinate conversion on two-dimensional image data such as the two-dimensional image data 1, 3, 5, 6, N described with reference to FIG. 8.

The three-dimensional data of the boundary between geologies in the global coordinate system, the geological area data, the specified two-dimensional image data including the boundary between geologies in the global coordinate system, and the two-dimensional image data not including the boundary between geologies in the global coordinate system are transmitted to the server 61 not only from the excavator 1, but also from a plurality of other excavators lot.

The server 61 creates a database of pieces of three-dimensional image data of the work target in the global coordinate system which are supplied from the excavator 1 and other excavators lot. As described above, the server 61 includes the arithmetic processing device and the storage device. The three-dimensional data of the work target supplied from the excavator 1 and other excavators lot are compiled into a database, and are stored in the storage device of the server 61.

The geological area data, the specified two-dimensional image data including the boundary between geologies in the global coordinate system, and the two-dimensional image data not including the boundary between geologies in the global coordinate system which are supplied from the excavator 1 and other excavators lot are also compiled into a database, and are stored in the storage device of the server 61.

The arithmetic processing device of the server 61 integrates pieces of three-dimensional data of the work target in the global coordinate system which are supplied from the excavator 1 and other excavators lot (step SP9). Three-dimensional data of the work target including the geological data of the entire construction site is thereby acquired. The server 61 causes the display device 65 to display the acquired three-dimensional data of the work target including the geological data of the entire construction site. A manager is thereby allowed to grasp geologies and the boundary between geologies at the entire construction site. Because the three-dimensional data of the work target including the geological data of the entire construction site is displayed on the display device 65, the manager may intuitively grasp the boundary between geologies at the entire construction site.

The arithmetic processing device of the server 61 may also perform integration of the geological area data supplied from the excavator 1 and other excavators lot, integration of the specified two-dimensional image data including a boundary between geologies in the global coordinate system, and integration of the two-dimensional image data not including a boundary between geologies in the global coordinate system. The integrated geological area data, the integrated specified two-dimensional image data including a boundary between geologies in the global coordinate system, and the integrated two-dimensional image data not including a boundary between geologies in the global coordinate system are displayed on the display device 65. The manager may thereby intuitively grasp distribution of geology of the entire construction site and a state of progress of work.

As described above, in the present embodiment, current landform data, which is three-dimensional data of the work target acquired by the detection processing device 51 based on the two-dimensional image data acquired by the imaging devices 30, is transmitted to the server 61 as the completed work data indicating a result of work at an end stage of a day's work and as the mid-work data indicating a result of work at a middle stage of a day's work. The manager may thereby intuitively grasp a state of progress of work based on the current landform data, which is three-dimensional data displayed on the display device 65 connected to the server 61.

[Operations and Effects]

As described above, according to the present embodiment, geological data including boundary data regarding geologies is acquired, and three-dimensional data including a boundary between geologies of a work target is acquired based on the geological data. Accordingly, three-dimensional data of a work target including geological data is efficiently acquired.

A construction site includes regions of various geologies, such as gravelly soil, sandy soil, and cohesive soil. An amount of work that can be performed per unit time or a construction period is possibly varied depending on the geology of a work target. In the case of an easily workable geology, such as a soft geology, the amount of work is increased and the construction period is reduced. In the case of a geology which is not easy to work on, such as a hard geology, the amount of work is reduced and the construction period is increased. In this manner, the geology of a work target affects the amount of work that can be performed per unit time or the construction period. Accordingly, it is important to investigate the geology of a work target, and to acquire data about the geology. According to the present embodiment, not only the type of the geology of the work target OBP, but also the boundary between geologies may be efficiently grasped based on the two-dimensional image data of the work target OBP. Accordingly, work can be performed with a high work efficiency based on data about geology including the type of geology and a boundary between geologies.

In the present embodiment, an identifier is added to two-dimensional image data including a boundary between soil properties. Accordingly, three-dimensional data including boundary data regarding geologies of the work target OBP is efficiently acquired based on specified two-dimensional image data to which an identifier is added.

In the case where boundary data regarding geologies is desired to be acquired, if an extremely large number of pieces of two-dimensional image data is acquired by the imaging devices 30, and two-dimensional image data including a boundary between geologies and two-dimensional image data not including a boundary between geologies are present in a mixed manner, a cumbersome process may become necessary to acquire three-dimensional data of a boundary between geologies, or acquisition of three-dimensional data of a boundary between geologies may take a long time. In the present embodiment, when two-dimensional image data is acquired by the imaging device 30, an identifier is added by the identifier adding unit 107 to two-dimensional image data including a boundary between geologies. Accordingly, when three-dimensional data of a boundary between geologies is desired to be acquired, the three-dimensional data of a boundary between geologies of the work target OBP may be efficiently acquired by extracting only the specified two-dimensional image data to which an identifier is added and by performing image processing.

In the present embodiment, coordinate conversion is performed on the two-dimensional image data of a boundary between geologies defined in the camera coordinate system, based on the position data of the swinging body 3 on which the imaging device 30 is mounted, the posture data of the swinging body 3, and the orientation data of the swinging body 3, and three-dimensional data of a boundary between geologies in the global coordinate system is thereby acquired. Accordingly, even if landform survey using a surveying device is not performed, for example, three-dimensional data of the work target in the global coordinate system may be acquired based on the two-dimensional image data acquired by the imaging device 30.

In the present embodiment, specific geological area data is acquired by combining three-dimensional data of a boundary between geologies. Accordingly, a distribution of geology of a construction site can be grasped.

In the present embodiment, the three-dimensional data and the geological area data of the work target are displayed on the display device 58 or the display device 65. Accordingly, the operator or the manager may look at the display device 65, and intuitively grasp the boundary between geologies or a distribution of geology.

In the present embodiment, whether or not a boundary between geologies is included in two-dimensional image data acquired by the imaging device 30 is determined by the operator, and in the case where it is determined that a boundary between geologies is included in the two-dimensional image data, the identifier adding switch 33 is operated. Accordingly, an identifier may be added to two-dimensional image data including a boundary between geologies without performing high-level image processing on two-dimensional image data acquired by the imaging device 30.

In the present embodiment, three-dimensional data acquired by the excavator 1 is supplied to the server 61. Three-dimensional data is supplied to the server 61 not only from the excavator 1, but also from other excavators lot. Accordingly, the server 61 may construct three-dimensional data of an entire construction site based on a plurality of pieces of three-dimensional data supplied.

In the embodiment described above, the operator operates the identifier adding switch 33, and adds an identifier to two-dimensional image data. The control system 50 may perform image processing on two-dimensional image data acquired by the imaging device 30, and may determine whether or not a boundary between geologies is included in the two-dimensional image data, based on the result of the image processing. For example, the control system 50 may determine whether or not a boundary between geologies is included in two-dimensional image data by performing edge detection on the two-dimensional image or by binarizing the two-dimensional image data.

In the embodiment described above, a description is given of an example where four imaging devices 30 are provided at the excavator 1, but it is sufficient if at least two imaging devices 30 are provided at the excavator 1.

In the embodiment described above, the server 61 may include a part or all of the functions of the detection processing device 51. That is, the server 61 may include at least one of the two-dimensional image data acquisition unit 101, the three-dimensional data acquisition unit 102, the position data acquisition unit 103, the posture data acquisition unit 104, the orientation data acquisition unit 105, the geological data acquisition unit 106, the identifier adding unit 107, the display control unit 108, the storage unit 109, and the input/output unit 110. For example, the two-dimensional image data captured by the imaging device 30 of the excavator 1, the position data of the swinging body 3 detected by the position detector 23, the posture data of the swinging body 3 detected by the posture detector 24, the orientation data of the swinging body 3 detected by the orientation detector 25, and the input data generated by the identifier adding switch 33 may be supplied to the server 61 through the communication device 26 and the communication network NTW. The identifier adding unit 107 of the server 61 may add an identifier to two-dimensional image data including a boundary between geologies of a work target, based on the two-dimensional image and the input data supplied through the communication device 26 and the communication network NTW. The three-dimensional data acquisition unit 102 of the server 61 may acquire three-dimensional data including boundary data regarding geologies, based on the specified two-dimensional image data to which the identifier is added. The three-dimensional data acquisition unit 102 of the server 61 may acquire three-dimensional data of the boundary between geologies in the global coordinate system, based on the position data, the posture data, and the orientation data of the swinging body 3 supplied through communication device 26 and the communication network NTW. The three-dimensional data acquisition unit 102 of the server 61 may combine a plurality of pieces of specified two-dimensional image data, and acquire specific geological area data.

Both two-dimensional image data including a boundary between geologies and two-dimensional image data not including a boundary between geologies are supplied to the server 61 from the excavator 1 and a plurality of other excavators lot. An extremely large number of pieces of two-dimensional image data is transmitted to the server 61 from the excavator 1 and a plurality of other excavators lot. By adding an identifier to two-dimensional image data including a boundary between geologies, when acquisition of three-dimensional data of a boundary between geologies is desired, the server 61 may extract only the specified two-dimensional image data to which the identifier is added and perform image processing, and the three-dimensional data of a boundary between geologies of the work target OBP may be efficiently acquired.

As described above, the three-dimensional data includes the geological data. At least one of the first geological data about a first geological area, the second geological data about a second geological area, and boundary data for between the first geological area and the second geological area may be stored in the storage unit 109 of the server 61.

In the embodiment described above, the operator specifies a boundary between geologies and inputs boundary data by operating the input unit 34, and the first geological area and the second geological area are specified based on the boundary data input by operation of the input unit 34. Image processing may be performed by a computer system on the two-dimensional image data acquired by the two-dimensional image data acquisition unit 101, and the boundary between geologies may be specified by the computer system.

In the embodiment described above, an identifier is added to two-dimensional image data including a boundary. The identifier does not have to be added to the two-dimensional image data including a boundary.

In the embodiment described, three-dimensional data is acquired by a stereo camera. The three-dimensional data may also be acquired by one camera and a three-dimensional measurement device such as a laser scanner.

In the embodiment described above, the three-dimensional data does not have to be acquired. In the case where two-dimensional image data including a boundary between geologies of a work target captured by the imaging device 30 provided at the excavator 1 is acquired by the two-dimensional image data acquisition unit 101, the position data of the excavator 1 is acquired by the position data acquisition unit 103, and the posture data of the excavator 1 is acquired by the posture data acquisition unit 104, the storage unit 109 provided at the server 61 may add, to the two-dimensional image data, the position data and the posture data of the excavator 1 at the time of acquisition of the two-dimensional image data and data about a time point of acquisition of the two-dimensional image data, and may store the two-dimensional image data. The storage unit 109 may also add the geological data of the work target to the two-dimensional image data, in addition to the position data and the posture data of the excavator 1 and the data about the time point, and may store the two-dimensional image data.

Event position data indicating a position of an event occurring at a work target may be associated with the three-dimensional data of the work target. For example, in the case where geological data of the work target is acquired by the geological data acquisition unit 106, and the event position data indicating the position of an event occurring at the work target is acquired by the position data acquisition unit 103 functioning as an event position data acquisition unit, the three-dimensional data acquisition unit 102 for acquiring three-dimensional data of the work target may acquire three-dimensional data including the geological data, information about what kind of an event has occurred (information about the event), and the event position data.

An event that occurs at a work target may be an eruption of water during work on the work target, a sudden increase in a load on the work unit, and the like. For example, if the blade tip 8BT is positioned at the position where water has erupted, the position data acquisition unit 103 may specify the event position data indicating the position where water has erupted, based on position data of the blade tip 8BT. The storage unit 109 may add the event position data to the three-dimensional data, and store the three-dimensional data.

In the embodiment described above, the work machine 1 is an excavator. The work machine 1 may be an excavation machine capable of excavating a work target or a transporting machine capable of transporting soil, as long as the work machine 1 is a work machine that is capable of working on the work target. For example, the work machine 1 may be a wheel loader, a bulldozer, or a dump track.

REFERENCE SIGNS LIST

1 EXCAVATOR (WORK MACHINE)
1B VEHICLE BODY
2 WORK UNIT
3 SWINGING BODY
4 CAB
5 TRAVELING BODY
6 BOOM
7 ARM
8 BUCKET
8B BLADE
8BT BLADE TIP
10 BOOM CYLINDER
11 ARM CYLINDER
12 BUCKET CYLINDER
21, 22 GPS ANTENNA
23 POSITION DETECTOR
24 POSTURE DETECTOR
25 ORIENTATION DETECTOR
26 COMMUNICATION DEVICE
26A COMMUNICATION ANTENNA
30 (30a, 30b, 30c, 30d) IMAGING DEVICE
31 HUB
32 IMAGING SWITCH
33 IDENTIFIER ADDING SWITCH
34 INPUT UNIT
51 DETECTION PROCESSING DEVICE
52 CONSTRUCTION DATA GENERATION DEVICE
57 CONSTRUCTION MANAGEMENT DEVICE
58 DISPLAY DEVICE
61 SERVER
62 COMMUNICATION DEVICE
63 COMMUNICATION ANTENNA
64 MOBILE TERMINAL DEVICE
65 DISPLAY DEVICE
100 CONSTRUCTION MANAGEMENT SYSTEM
101 TWO-DIMENSIONAL IMAGE DATA ACQUISITION UNIT
102 THREE-DIMENSIONAL DATA ACQUISITION UNIT
103 POSITION DATA ACQUISITION UNIT
104 POSTURE DATA ACQUISITION UNIT
105 ORIENTATION DATA ACQUISITION UNIT
106 GEOLOGICAL DATA ACQUISITION UNIT
107 IDENTIFIER ADDING UNIT
108 DISPLAY CONTROL UNIT

109 STORAGE UNIT
110 INPUT/OUTPUT UNIT
NTW COMMUNICATION NETWORK

The invention claimed is:

1. A construction management system comprising: a work machine, operated by an operator, with at least one pair of image devices; a geological data input unit including a computer keyboard or a touch panel; a detection processing device comprising: a computer system including a processor, a storage device and an input/output interface, the detection processing device including: a two-dimensional image data acquisition processor unit and a three-dimensional data acquisition processor unit; the two-dimensional image data acquisition processor unit, being capable of performing data communication, configured to acquire two-dimensional image data of a work target captured by the imaging device; the input unit configured for operator input of geological data including a boundary between geologies to the two-dimensional image data by the operator inputting, at a boundary position of the geologies in the two-dimensional image data of the work target, boundary data indicating the position of the boundary in the data, the boundary data being included in the geological data; the three-dimensional data acquisition processor unit acquires three-dimensional data including the boundary between geologies based on a pair of pieces of two-dimensional image data of the work target captured by the at least one pair of image devices including the two-dimensional image data; and an identifier adding processor unit configured to add an identifier to the two-dimensional image data to which the geological data including the boundary between geologies is input; wherein the geological data is data input by the operator through the input unit, and includes at least boundary data between a first geological area and a second geological area having a different geology from the first geological area, data about a first geology indicating a geology of the first geological area, and data about a second geology indicating a geology of the second geological area, and the data about the first and second geologies including at least a rock quality and stiffness of ground and thus the three-dimensional data including the boundary data between the geologies is acquired by extracting two-dimensional image data to which the identifier is added having based on the operator input geological data and by performing image processing, whereby the three-dimensional data of a boundary between geologies are efficiently acquired.

2. The construction management system according to claim 1, wherein
the geological data is added to a geological region defined based on the boundary between geologies, or the geological data is added to a partial region in the three-dimensional data.

3. The construction management system according to claim 1, further comprising:
an event position data acquisition processor unit, being capable of performing data communication, configured to acquire event position data indicating a position of an event occurring at the work target, wherein
the three-dimensional data acquisition processor unit is configured to add information about the event and the event position data to the three-dimensional data.

4. The construction management system according to claim 3, wherein
the event includes an eruption of water from ground, or an increase in a work load.

5. A construction management system according to claim 1, further comprising:
an event position data acquisition processor unit, being capable of performing data communication, configured to acquire event position data indicating a position of an event occurring at the work target, wherein
the three-dimensional data acquisition processor unit is configured to add information about the event and the event position data to the three-dimensional data acquired by the three-dimensional data acquisition processor unit.

6. The construction management system according to claim 1, wherein the two-dimensional image data of the boundary between geologies is defined in a camera coordinate system defined by an Xs-axis extending in one direction with respect to an origin set on an imaging device, a Ys-axis perpendicular to the Xs-axis, and a Zs-axis perpendicular to the Xs-axis and the Ys-axis.

7. The construction management system according to claim 1, whereby three-dimensional data of the boundary between geologies is acquired by coordinate conversion performed on the two-dimensional image data of the boundary between geologies.

8. A construction management system comprising: a work machine, operated by an operator, with at least one pair of image devices; a geological data input unit including a computer keyboard or a touch panel; a detection processing device comprising: a computer system including a processor, a storage device and an input/output interface, the detection processing device including: a two-dimensional image data acquisition processor unit; the two-dimensional image data acquisition processor unit, being capable of performing data communication, configured to acquire two-dimensional image data of a work target captured by the imaging device; the input unit configured for operator input of geological data including a boundary between geologies to the two-dimensional image data by the operator inputting, at a boundary position of the geologies in the two-dimensional image data of the work target, boundary data indicating the position of the boundary in the data, the boundary data being included in the geological data; a position data acquisition processor unit, being capable of performing data communication, configured to acquire position data at a time point at which the two-dimensional image data is captured by the imaging device; and an identifier adding processor unit configured to add an identifier to the two-dimensional image data to which the geological data including the boundary between geologies is input; wherein the geological data is data input by the operator through the input unit, and includes at least boundary data between a first geological area and a second geological area having a different geology from the first geological area, data about a first geology indicating a geology of the first geological area, and data about a second geology indicating a geology of the second geological area, and the data about the first and second geologies including at least a rock quality and stiffness of ground, and a storage unit configured to add, to the two-dimensional image data, the position data of the work machine at a time point at which the two-dimensional image data is acquired, the geological data of a ground surface included in the two-dimensional image data, and time point data about the time point at which the two-dimensional image data is acquired, and configured to store the two-dimensional image data, whereby the two-dimensional image data to which the identifier is added having the operator input geological data is extracted and image processed, whereby image processing is efficiently acquired.

* * * * *